(12) United States Patent
Ridenour et al.

(10) Patent No.: US 6,449,120 B1
(45) Date of Patent: Sep. 10, 2002

(54) REDUCING BEARING CONTAMINANT MIGRATION FROM A HARD DISC DRIVE CARTRIDGE BEARING ASSEMBLY

(75) Inventors: Phillip R. Ridenour, Mustang; Suzanne M. Zampaloni, Tinker Air Force Base, both of OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 08/806,494

(22) Filed: Apr. 21, 1997

Related U.S. Application Data

(60) Provisional application No. 60/033,667, filed on Dec. 18, 1996.

(51) Int. Cl.[7] .......................... G11B 17/02; G11B 33/14
(52) U.S. Cl. ......................... 360/99.08; 360/97.02
(58) Field of Search .................. 384/480, 484, 384/485, 486, 489, 144; 277/53–57; 360/106, 99.08, 97.02

(56) References Cited

U.S. PATENT DOCUMENTS

| | | | | |
|---|---|---|---|---|
| 3,810,636 A | * | 5/1974 | Gorski ........................ | 277/94 |
| 3,874,751 A | * | 4/1975 | Okubo et al. .............. | 384/222 |
| 4,408,808 A | * | 10/1983 | Redmann, Jr. et al. ..... | 384/473 |
| 5,061,868 A | * | 10/1991 | Iwazaki et al. ............ | 310/67 R |
| 5,074,408 A | * | 12/1991 | Smith et al. ................ | 198/842 |
| 5,074,567 A | * | 12/1991 | Orlowski ..................... | 277/25 |
| 5,212,607 A | | 5/1993 | Elsing et al. | |
| 5,227,686 A | * | 7/1993 | Ogawa ........................ | 310/90 |
| 5,262,907 A | | 11/1993 | Duffy et al. | |
| 5,295,029 A | | 3/1994 | Elsing et al. | |
| 5,305,163 A | * | 4/1994 | Holm ...................... | 360/98.01 |
| 5,376,850 A | | 12/1994 | Elsing et al. | |
| 5,403,098 A | * | 4/1995 | Yasui et al. ................. | 384/115 |
| 5,430,589 A | * | 7/1995 | Moir et al. ............... | 360/97.02 |
| 5,482,381 A | * | 1/1996 | Krum et al. ................ | 384/480 |

FOREIGN PATENT DOCUMENTS

| | | | |
|---|---|---|---|
| JP | 1-277374 | * | 11/1989 |
| JP | 5-62450 | * | 3/1993 |
| JP | 8-249873 | * | 9/1996 |

* cited by examiner

Primary Examiner—William Klimowicz
(74) Attorney, Agent, or Firm—Crowe & Dunlevy

(57) ABSTRACT

Apparatus for reducing bearing contaminant migration from a cartridge bearing assembly of a hard disc drive actuator assembly. The cartridge bearing assembly includes a stationary shaft, a bearing assembly and a cartridge bearing sleeve. The bearing assembly is disposed between and rigidly affixed to the stationary shaft and the cartridge bearing sleeve so as to facilitate radial movement of the cartridge bearing sleeve relative to the stationary shaft. A retention disc is rigidly affixed to a portion of the cartridge bearing sleeve adjacent the bearing assembly to form a retention chamber adjacent the bearing assembly to minimize the migration of contaminants from the bearing assembly to the interior of the disc drive. Adhesive is used to bond the retention disc to the cartridge bearing sleeve, the adhesive providing additional sealing against the passage of contaminants between the retention disc and the cartridge bearing sleeve. A circular flange is provided at an inner diameter of the retention disc, the flange disposed in close proximity to and substantially parallel with the stationary shaft, the flange and the shaft cooperating to form a labyrinth seal to further minimize the migration of contaminants from the retention chamber to the interior environment of the disc drive.

6 Claims, 2 Drawing Sheets

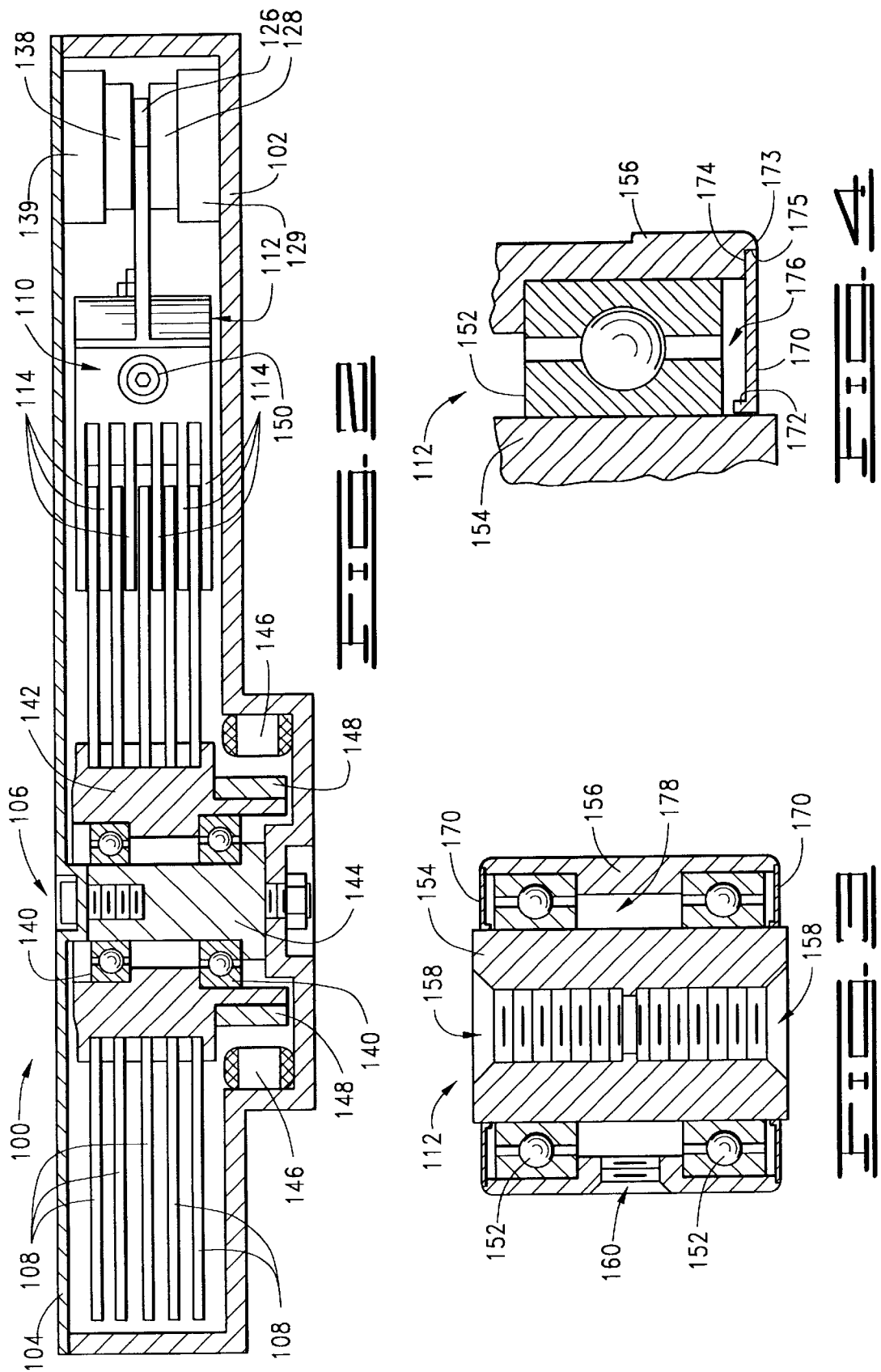

REDUCING BEARING CONTAMINANT MIGRATION FROM A HARD DISC DRIVE CARTRIDGE BEARING ASSEMBLY

RELATED APPLICATIONS

This application claims priority to Provisional Application Ser. No. 60/033,667 filed Dec. 18, 1996.

FIELD OF THE INVENTION

This invention relates generally to the field of rotating mechanical devices, and more particularly, but not by way of limitation, to the reduction of bearing contaminant migration from a cartridge bearing assembly of a hard disc drive actuator assembly.

BACKGROUND

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al. (Duffy '907), the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

During track following in which a selected head is caused to follow a selected track, a servo processor compares the value of the PES to a desired value indicative of the desired position of the head to the selected track and issues a digital correction signal to the power amplifier, which in turn provides an analog current to the actuator coil to adjust the position of the head with respect to the track. During a seek operation in which a selected head is moved from an initial track to a destination track, relatively large currents are applied to the coil to initially accelerate and then decelerate the head towards the destination track. The velocity of the head is repeatedly measured and the current applied to the coil is adjusted in accordance with the difference between the actual velocity of the head and a velocity profile.

As will be recognized, a continuing trend in the industry is to provide successive generations of disc drives with ever improved capacity and performance characteristics at an ever decreasing cost. To this end, improvements are continually being made to improve disc drive data storage and transfer rates, including increases in the rotational speeds of the discs, increases in track densities and increases in the radial velocities of the heads during seek operations. However, a problem that has been experienced with increases in the radial velocities attained by heads during seeks is the migration of contaminants (such as lubricants and particulates) from the cartridge bearing assemblies used to facilitate rotation of the actuators. As will be recognized, such contaminants can adversely affect the performance of a disc drive should such contaminants migrate to the surfaces of the discs.

The problem of bearing contaminant migration to the interior environment of a disc drive is not new, per se. Particularly, the prior art includes a variety of approaches to minimize the egress of contaminants from bearings used with the spindle motors to facilitate rotation of the discs, such as exemplified by U.S. Pat. No. 5,295,029 entitled Disk Drive Including Unitary Deck for Aligning and Supporting Axially Retractable Spindle Assembly, issued Mar. 15, 1994 to Elsing et al (Elsing '029), assigned to the assignee of the present invention. This reference teaches the use of a labyrinth seal as part of a disc drive spindle motor configuration to minimize the migration of contaminants from the spindle motor bearings to remaining portions of the interior environment of the disc drive. Other approaches have also been taken to minimize the migration of spindle motor bearing contaminants, including the use of a ferro-fluidic seal in which a magnetic fluid is disposed between closely disposed rotating and stationary portions of a spindle motor to create a barrier to the passage of contaminants through the seal. Contamination from spindle motor bearings is of particular concern due to the high rotational speeds at which the discs are now rotated (sometimes in excess of 10,000 revolutions per minute).

Although spindle motor bearings have been generally found to be the primary source for bearing-generated contaminants, attempts have also been made by disc drive manufacturers to minimize the egress of bearing contaminants from the cartridge bearing assemblies used to facilitate radial movement of disc drive actuators. One example of interest is the prior art use of a washer-type disc that is press-fitted over a stationary shaft of the cartridge bearing assembly so as to outwardly extend to a radial point that is in close proximity to a rotating portion of the cartridge bearing assembly. However, problems have been identified with this and other approaches to minimize cartridge bearing assembly contamination.

First, contaminants have been found to typically migrate in a direction away from the center of the cartridge bearing assembly as a result of centrifugal forces exerted during rotation of the actuator assembly; thus, approaches like the washer-type disc do little to prevent the migration of contaminants between the stationary disc and the rotating portion of the cartridge bearing assembly adjacent the disc. Moreover, contaminants have been found to migrate through the typical metal-to-metal contacts such as obtained from a press-fit operation, and such migration is enhanced as performance characteristics of a disc drive are increased. Bearing seal materials that are routinely used in other applications are often unsuitable for use within the interior environment of a disc drive. Finally, prior art approaches to reducing bearing contaminant migration have been found to be excessively expensive, in terms of either labor or material costs, or both.

Accordingly, there is a continual need for improvements in bearing contaminant retention methodologies that are both operationally effective and inexpensively implemented.

SUMMARY OF THE INVENTION

The present invention provides an apparatus for minimizing the migration of contaminants from the bearings of a cartridge bearing assembly of a disc drive.

In accordance with the preferred embodiment, the cartridge bearing assembly includes a stationary shaft, a bearing assembly and a cartridge bearing sleeve. The bearing assembly is disposed between and rigidly affixed to the stationary shaft and the cartridge bearing sleeve so as to facilitate radial movement of the cartridge bearing sleeve relative to the stationary shaft.

A retention disc is rigidly affixed to a portion of the cartridge bearing sleeve adjacent the bearing assembly to form a retention chamber adjacent the bearing assembly to prevent the migration of contaminants from the bearing assembly to the interior of the disc drive.

Adhesive is used to bond the retention disc to the cartridge bearing sleeve, the adhesive providing additional sealing against the passage of contaminants between the retention disc and the cartridge bearing sleeve.

A circular flange is provided at an inner diameter of the retention disc, the flange disposed in close proximity to and substantially parallel with the stationary shaft, the flange and the shaft cooperating to form a labyrinth seal to further minimize the egress of contaminants from the retention chamber to the interior environment of the disc drive.

These and various other features as well as advantages which characterize the present invention will be apparent from a reading of the following detailed description and a review of the associated drawings.

BRIEF DESCRIPTION OF THE DRAWINGS

FIG. 3 provides a cross-sectional, elevational view of the cartridge bearing assembly of FIGS. 1 and 2, including a pair of retention discs constructed in accordance with the preferred embodiment of the present invention.

FIG. 4 provides a cross-sectional, elevational view of a portion of FIG. 4 showing one of the retention discs in greater detail.

FIG. 5 is a perspective view of one of the retention discs of FIGS. 3 and 4.

DETAILED DESCRIPTION

Figure 1:
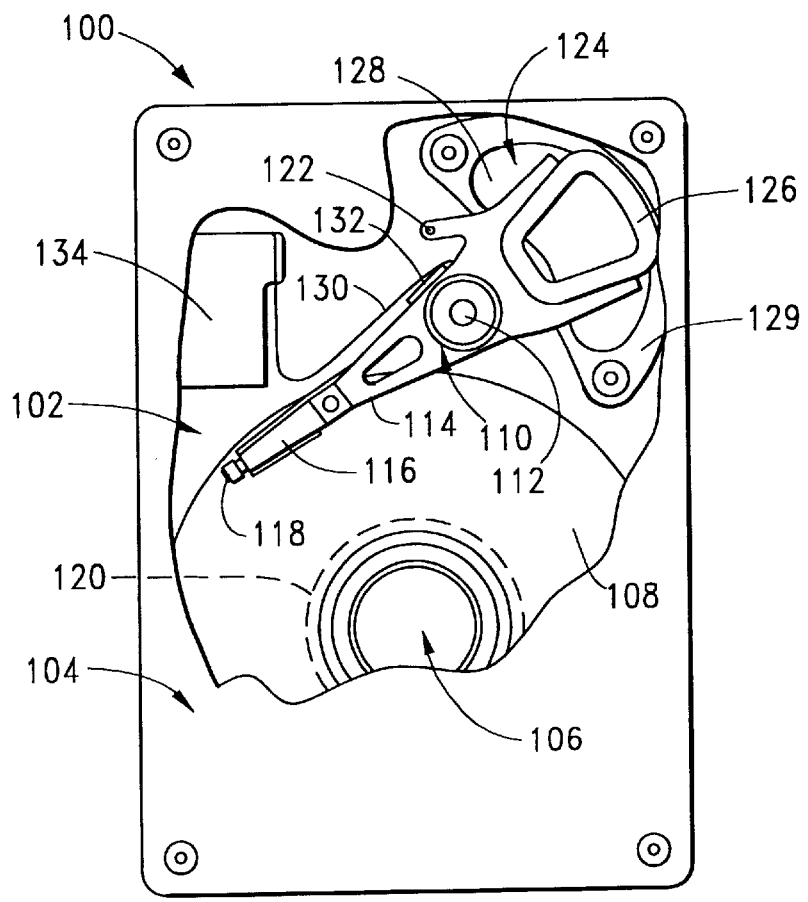
FIG. 1 shows a disc drive constructed in accordance with the preferred embodiment of the present invention.

Referring now to FIG. 1, shown therein is a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form a sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a cartridge bearing assembly 112 positioned adjacent the discs 108. The cartridge bearing assembly 112 will be discussed in greater detail below.

The actuator assembly 110 includes a plurality of actuator arms 114 which extend towards the discs 108, with one or more flexures 116 extending from each of the actuator arms 114. Mounted at the distal end of each of the flexures 116 is a head 118 which includes a slider assembly (not separately designated) designed to enable the head 118 to fly in close proximity to the corresponding surface of the associated disc 108.

At such time that the disc drive 100 is not in use, the heads 118 are moved over landing zones 120 near the inner diameter of the discs 108. The heads 118 are secured over the landing zones 120 through the use of a conventional latch arrangement, such as designated at 122, which prevents inadvertent rotation of the actuator assembly 110 when the heads are parked.

The radial position of the heads 118 is controlled through the use of a voice coil motor (VCM) 124, which as will be recognized typically includes a coil 126 attached to the actuator assembly 110, as well as one or more permanent magnets 128 and corresponding magnetically permeable pole-pieces 129 which establish a magnetic field in which the coil 126 is immersed. Thus, the controlled application of current to the coil 126 causes magnetic interaction between the magnetic field of the VCM 124 and electro-magnetic fields induced in the coil 126 so that the coil 126 moves in accordance with the well known Lorentz relationship. As the coil 126 moves, the actuator assembly 110 pivots about the cartridge bearing assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
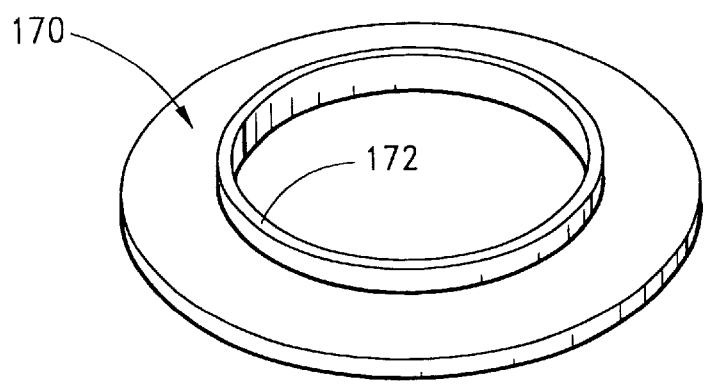
FIG. 2 provides a cross-sectional, elevational view of the disc drive of FIG. 1.

Referring now to FIG. 2, shown therein is a cross-sectional, elevational view of the disc drive 100 of FIG. 1. As will be recognized by those skilled in the art, features normally associated with the bottom side of the disc drive 100 have been omitted from FIG. 2 for purposes of clarity, such as the disc drive printed circuit board and standoffs used to secure the disc drive 100 within a host computer environment. Moreover, for purposes of clarity the flexures 116 and heads 118 of FIG. 1 have not been shown attached to the actuator arms 114 in FIG. 2. As shown in FIG. 2, the disc drive 100 has a total of five discs 108 and six corresponding actuator arms 114.

FIG. 2 illustrates several components of interest, such as remaining portions of the VCM 124 (which includes a second permanent magnet 138 and a second pole-piece 139). Likewise, the internal configuration of the spindle motor 106 is set forth more fully in FIG. 2 and is shown to comprise bearing assemblies 140 which facilitate rotation of a spindle motor hub assembly 142 about a stationary shaft 144. Rotation of the spindle motor 106 is achieved through the conventional application of current to a plurality of coils 146 and the magnetic interaction therewith by permanent magnets 148 disposed closely adjacent the coils 146. Although the coils 146 are shown in FIG. 2 to be disposed below the discs 108, it will be readily understood that other spindle motor configurations can readily be used, such as the location of the coils between the spindle motor bearings as disclosed in the previously discussed Elsing '029 reference.

FIG. 2 further provides a non-sectional, elevational view of the actuator assembly 110 of FIG. 1. Although not visible in FIG. 2, it will be clearly understood that the cartridge bearing assembly 112 is disposed within the actuator assembly 110 and facilitates radial movement of the actuator assembly 110 relative to the discs 108. The cartridge bearing assembly 112 is secured to the base deck 102 and the top cover 104 by way of suitable hardware (not shown). In the preferred embodiment, the bearing cartridge assembly 112 is further secured within the actuator assembly 110 by way of a recessed set screw 150.

Referring now to FIG. 3, shown therein is a cross-sectional, elevational view of the cartridge bearing assembly 112 of FIG. 1 (as will be recognized, the cartridge bearing assembly is not visible in FIG. 2). The cartridge bearing assembly 112 is shown in FIG. 3 to comprise a pair of bearing assemblies 152 disposed between a stationary shaft 154 and a cartridge bearing sleeve 156, the bearing assemblies 152 facilitating rotation of the cartridge bearing sleeve 156 about the stationary shaft 154. Threaded holes 158 with corresponding beveled openings accommodate the conventional hardware (not shown) used to secure the cartridge bearing assembly 112 to the base deck 102 and the top cover 104 of the disc drive 100, as discussed above. A threaded hole 160 aligns with a corresponding hole (not shown) in the side of the actuator assembly 110 to accommodate installation of the recessed set screw 150 (FIG. 2) in order to affix the cartridge bearing assembly 112 within the actuator assembly 110.

Of particular interest in FIG. 3 are a pair of retention discs 170, constructed in accordance with the preferred embodiment of the present invention. The retention discs 170 are disposed adjacent the bearing assemblies 152 as shown, and operate in cooperation with portions of the cartridge bearing sleeve 156 to minimize the migration of contaminants from the bearing assemblies 152 out of the cartridge bearing assembly 112.

As shown in greater detail in FIGS. 4 and 5, each of the retention discs 170 comprises a circular shaped member having an outer diameter generally corresponding to a diameter of a portion of the cartridge bearing sleeve 156 and an inner diameter generally corresponding to a diameter of a portion of the stationary shaft 154. Each of the retention discs 170 further comprises a circular flange 172 disposed at the inner diameter of the retention disc 170, the circular flange 172 extending in a direction substantially normal to the rest of the retention disc 170. The retention disc 170 can be formed from any material suitable for use within the interior environment of the disc drive 100, and is preferably formed from stainless steel.

To secure each of the retention discs 170 to the cartridge bearing sleeve 156, a corresponding shelf 174 is provided in the cartridge bearing sleeve 156, the shelf 174 being sized to closely accommodate the outer diameter portions of the retention disc 170. More particularly, each end of the cartridge bearing sleeve 156 is fashioned to include first and second surfaces 173, 175 within the radial extent of the sleeve 156, with the shelf 174 forming a third surface, so that the first and third surfaces 173, 174 are substantially parallel and are separated by the second surface 175. Accordingly, the second and third surfaces 175, 174 form a shoulder sized to accommodate the rigid affixing of the outer diameter of the retention disc 170. During assembly of the cartridge bearing assembly 112, the bearing assemblies 152 are aligned and appropriately preloaded between the stationary shaft 154 and the cartridge bearing sleeve 156. A suitable adhesive is then applied to the second and third surfaces 175, 174, 174 of the cartridge bearing sleeve 156 and the retention discs 170 are bonded in place. The cartridge bearing assembly 112 is then secured within the actuator assembly 110 as described above (using the set-screw 150) and eventually installed into the disc drive 100 in accordance with the configuration shown in FIG. 2.

It will be recognized from the foregoing discussion that the retention discs 170 are disposed adjacent to the bearing assemblies 152 of the cartridge bearing assembly 112 so as to form retention chambers (indicated at 176 in FIG. 4) between the bearing assemblies 152 and the remaining portions of the interior environment of the disc drive 100. Contaminants emitted by the bearing assemblies 152 will thus tend to either migrate to the retention chambers 176 between the bearing assemblies 152 and the retention discs 170, or will tend to migrate to a cylindrical chamber formed between the bearing assemblies (indicated at 178 in FIG. 3). Contaminants that migrate to the retention chambers 176 will generally tend to accumulate towards the cartridge bearing sleeve 156 as a result of the centrifugal forces exerted on such contaminants during radial movement of the actuator assembly 110. Such contaminants will be effectively retained within the retention chambers 176 as a result of the sealing characteristics of the adhesive used to bond the retention discs 170 to the cartridge bearing sleeves 156. Moreover, the circular flange 172 in combination with the stationary shaft 154 will form a labyrinth seal therebetween which will further advantageously impede migration of airborne particulates as well as lubricants out of the retention chambers 176 and into the remaining portions of the interior environment of the disc drive 100.

A significant advantage associated with the use of the retention discs 170 is the relative ease with which the retention discs 170 can be formed and installed during disc drive manufacturing. Moreover, the use of adhesive as described herein to secure the retention discs 170 eliminates the leaks heretofore encountered in typical metal-to-metal contacts associated with press-fit operations and facilitates a relaxing of the strict tolerances that must be maintained for such operations. Substantial cost savings in both time and labor can also be readily achieved, which is a significant advantage in the large-scale manufacturing of disc drives.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A cartridge bearing assembly, comprising:

a stationary shaft having an outer diameter;

a bearing assembly having an inner race and an outer race, the inner race rigidly affixed to the outer diameter of the shaft;

a rotatable cartridge bearing sleeve rigidly affixed to the outer race of the bearing assembly; and a retention disc comprising:
   an outer diameter rigidly affixed to the cartridge bearing sleeve;
   an inner diameter proximate to the outer diameter of the shaft; and
   a flange, disposed at the inner diameter of the retention disc, the flange extending in a direction substantially parallel with the stationary shaft and toward the bearing assembly;

wherein the retention disc, the cartridge bearing sleeve, the bearing assembly and the stationary shaft form a retention chamber for receivingly retaining contaminants generated by the bearing assembly, and wherein the flange and a portion of the stationary shaft adjacent the flange form a labyrinth seal, the labyrinth seal minimizing the egress of contaminants from the retention chamber.

2. The cartridge bearing assembly of claim 1, wherein the retention disc is rigidly attached to the portion of the cartridge bearing sleeve by way of adhesive, the adhesive providing a seal against the migration of contaminants out of the retention chamber between the retention disc and the portion of the cartridge bearing sleeve.

3. The cartridge bearing assembly of claim 1, further comprising:

an outer diameter comprising a circumferentially extending surface at a selected distance from the outer diameter of the shaft;

an inner diameter comprising a circumferentially extending surface at a second selected distance from the outer diameter of the shaft, the inner diameter contacting the outer race of the bearing assembly; and first, second and third surfaces disposed between the inner and outer diameters, the first surface extending from the outer diameter of the cartridge bearing sleeve, the third surface extending from the inner diameter of the cartridge bearing sleeve and the second surface joining the first and third surfaces so that the first and third surfaces are substantially parallel and the second surface is substantially normal to the first and third surfaces, the second and third surfaces forming a shoulder for accommodating the outer diameter of the retention disc.

4. A disc drive, comprising:

a base deck;

a top cover attached to the base deck, the top cover and the base deck cooperating to form a sealed interior environment for the disc drive;

a spindle motor connected to the base deck, the spindle motor having a rotatable spindle motor hub;

a disc connected to the spindle motor hub; and an actuator assembly connected to the base deck, the actuator assembly comprising:
   an actuator arm disposed in a direction adjacent the disc;
   a flexure extending from the actuator arm;
   a read/write head connected to the flexure; and
   a cartridge bearing assembly facilitating radial movement of the read/write head with respect to the disc, comprising:
      a stationary shaft having an outer diameter;
      a rotatable cartridge bearing sleeve having an inner diameter;
      a bearing assembly disposed between and connected to the stationary shaft, the bearing assembly facilitating radial movement of the cartridge bearing sleeve relative to the stationary shaft; and
      a retention disc comprising:
         an outer diameter rigidly attached to the cartridge bearing sleeve;
         an inner diameter proximate to the outer diameter of the shaft; and
         a flange, disposed at the inner diameter of the retention disc, the flange extending in a direction substantially parallel with the stationary shaft and toward the bearing assembly;

wherein the retention disc, the cartridge bearing sleeve, the bearing assembly and the stationary shaft form a retention chamber for receivingly retaining contaminants generated by the bearing assembly, and wherein the flange and the stationary shaft adjacent the flange form a labyrinth seal, the labyrinth seal minimizing the egress of contaminants from the retention chamber.

5. The disc drive of claim 4 wherein the retention disc is rigidly attached to the portion of the cartridge bearing sleeve by way of adhesive, the adhesive providing a seal against the migration of contaminants out of the retention chamber between the retention disc and the portion of the cartridge bearing sleeve.

6. The disc drive of claim 4, wherein the bearing assembly has an outer race, the cartridge bearing assembly further comprising:

an outer diameter comprising a circumferentially extending surface at a selected distance from the outer diameter of the shaft;

an inner diameter comprising a circumferentially extending surface at a second selected distance from the outer diameter of the shaft, the inner diameter contacting the outer race of the bearing assembly; and first, second and third surfaces disposed between the inner and outer diameters, the first surface extending from the outer diameter of the cartridge bearing sleeve, the third surface extending from the inner diameter of the cartridge bearing sleeve and the second surface joining the first and third surfaces so that the first and third surfaces are substantially parallel and the second surface is substantially normal to the first and third surfaces, the second and third surfaces forming a shoulder for accommodating the outer diameter of the retention disc.

* * * * *